(12) United States Patent
Kong et al.

(10) Patent No.: US 11,342,623 B2
(45) Date of Patent: May 24, 2022

(54) BATTERY PACK AND VEHICLE INCLUDING SAME

(71) Applicant: LG Chem, Ltd., Seoul (KR)

(72) Inventors: Jin-Hak Kong, Daejeon (KR); Dong-Yeon Kim, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 155 days.

(21) Appl. No.: 16/603,048

(22) PCT Filed: Aug. 30, 2018

(86) PCT No.: PCT/KR2018/010083
§ 371 (c)(1),
(2) Date: Oct. 4, 2019

(87) PCT Pub. No.: WO2019/083149
PCT Pub. Date: May 2, 2019

(65) Prior Publication Data
US 2020/0287182 A1    Sep. 10, 2020

(30) Foreign Application Priority Data
Oct. 24, 2017  (KR) .................. 10-2017-0138611

(51) Int. Cl.
*H01M 4/02* (2006.01)
*H01M 50/20* (2021.01)
*B60L 50/64* (2019.01)
*B60K 6/28* (2007.10)

(52) U.S. Cl.
CPC ............ *H01M 50/20* (2021.01); *B60L 50/64* (2019.02); *B60K 6/28* (2013.01); *B60Y 2200/91* (2013.01); *B60Y 2200/92* (2013.01); *H01M 2220/20* (2013.01)

(58) Field of Classification Search
CPC ....................................... H01M 4/02
See application file for complete search history.

(56) References Cited

U.S. PATENT DOCUMENTS

| 2010/0035142 A1 | 2/2010 | Ha et al. |
| 2010/0151299 A1 | 6/2010 | Ha et al. |
| 2012/0224326 A1 | 9/2012 | Kohlberger et al. |
| 2013/0084480 A1 | 4/2013 | Kim et al. |

(Continued)

FOREIGN PATENT DOCUMENTS

| CN | 101517777 A | 8/2009 |
| CN | 102088066 A | 6/2011 |

(Continued)

OTHER PUBLICATIONS

Extended European Search Report dated May 25, 2020 for Application No. 18869840.1.

*Primary Examiner* — Jacob B Marks
(74) *Attorney, Agent, or Firm* — Birch, Stewart, Kolasch & Birch, LLP (57) ABSTRACT

Disclosed is a battery pack, which includes a plurality of battery modules, each having at least one battery cell, and a battery tray to which the plurality of battery modules are mounted. The plurality of battery modules are coupled to each other by sliding and make surface contact with each other on at least one side surface thereof.

13 Claims, 10 Drawing Sheets

(56) References Cited

U.S. PATENT DOCUMENTS

| | | | | |
|---|---|---|---|---|
| 2013/0202940 A1* | 8/2013 | Gendlin | ............ | H01M 10/6556 429/120 |
| 2015/0311486 A1 | 10/2015 | Kwag et al. | | |
| 2017/0133641 A1 | 5/2017 | Lee | | |

FOREIGN PATENT DOCUMENTS

| | | | |
|---|---|---|---|
| CN | 105185932 | A | 12/2015 |
| CN | 205488279 | U | 8/2016 |
| CN | 106410085 | A | 2/2017 |
| GB | 2044983 | A | 10/1980 |
| JP | 2008-278625 | A | 11/2008 |
| JP | 2010-123412 | A | 6/2010 |
| JP | 2010-232102 | * | 10/2010 |
| JP | 2010-232102 | A | 10/2010 |
| JP | 2015-65073 | A | 4/2015 |
| KR | 10-0203160 | B1 | 6/1999 |
| KR | 20-1999-0023382 | U | 7/1999 |
| KR | 10-0680543 | B1 | 2/2007 |
| KR | 10-2012-0005727 | A | 1/2012 |
| KR | 10-2013-0105472 | A | 9/2013 |
| KR | 10-1503983 | B | 3/2015 |
| KR | 10-2016-0005894 | A | 1/2016 |
| TW | 201517356 | A | 5/2015 |
| WO | WO 2008/035875 | A1 | 3/2008 |

\* cited by examiner

FIG. 10

BATTERY PACK AND VEHICLE INCLUDING SAME

CROSS-REFERENCES TO RELATED APPLICATIONS

This application is a U.S. national phase application, pursuant to 35 U.S.C. § 371, of PCT/KR2018/010083, filed Aug. 30, 2018, designating the United States, which claims priority to Korean Application No. 10-2017-0138611, filed Oct. 24, 2017. The entire contents of the aforementioned patent applications are incorporated herein by this reference.

TECHNICAL FIELD

The present disclosure relates to a battery pack, and a vehicle including the battery pack.

BACKGROUND ART

Secondary batteries which are highly applicable to various products and exhibit superior electrical properties such as high energy density and the like are commonly used not only in portable devices but also in electric vehicles (EVs) or hybrid electric vehicles (HEVs) operated based on electrical power sources. The secondary battery is drawing attentions as a new energy source having enhanced environmental friendliness and energy efficiency since the use of fossil fuels can be greatly reduced and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, when a higher output voltage is required, a plurality of battery cells are connected in series to configure a battery pack. In addition, depending on the charge/discharge capacity required for the battery pack, a plurality of battery cells may be connected in parallel to configure a battery pack. Thus, the number of battery cells included in the battery pack may be variously determined based on the required output voltage or the demanded charge/discharge capacity.

Meanwhile, when a plurality of battery cells are connected in series or in parallel to configure a battery pack, it is common to configure a battery module composed of at least one battery cell first, and then configure a battery pack using at least one battery module and adding other components. The battery cells that configure the battery module or the battery pack are generally pouch-type secondary batteries that may be easily stacked on one another.

A conventional battery pack generally includes a plurality of battery modules and a battery tray mounted to a vehicle or the like to dispose the plurality of battery modules thereon. When the battery modules are disposed on the battery tray, each battery module is coupled to the battery tray by bolting using a long bolt or the like. In addition, the battery modules are disposed to be spaced apart from each other by a predetermined distance on the battery tray.

However, in the conventional battery pack, an empty space is inevitably formed between the battery modules disposed on the battery tray due to the separation between the battery modules. The empty space reduces the space utilization of the entire battery pack.

In addition, in the conventional battery pack, since the battery module and the battery tray are coupled only by bolting using a long bolt or the like, the load is concentrated on the bolt coupling portion of the battery module and the battery tray, thereby deteriorating the structural stability.

DISCLOSURE

Technical Problem

Therefore, the present disclosure is directed to providing a battery pack, which may improve the space utilization of battery modules, and a vehicle including the battery pack.

The present disclosure is also directed to providing a battery pack, which may distribute the load when the battery module is coupled to a battery tray, and a vehicle including the battery pack.

The present disclosure is also directed to providing a battery pack, which may improve the structural stability, and a vehicle including the battery pack.

The present disclosure is also directed to providing a battery pack, which may improve the efficiency of the assembly process, and a vehicle including the battery pack.

Technical Solution

In one aspect of the present disclosure, a battery pack may include a plurality of battery modules, each having at least one battery cell, and a battery tray to which the plurality of battery modules are mounted. The plurality of battery modules may be coupled to each other by sliding and may make surface contact with each other on at least one side surface thereof.

The plurality of battery modules may be coupled to the battery tray by sliding.

The battery tray may include a plurality of sliding guide rails formed along a longitudinal direction of the plurality of battery modules to allow the plurality of battery modules to be mounted thereto by sliding.

The plurality of sliding guide rails may include at least one sliding guide groove formed along a longitudinal direction of the battery tray and having a predetermined depth, and at least one sliding guide protrusion spaced apart from the at least one sliding guide groove by a predetermined distance and protruding with a predetermined height.

Each of the plurality of battery modules may include at least one sliding protrusion configured to be coupled to the at least one sliding guide groove by sliding, and at least one sliding groove configured to be coupled to the at least one sliding guide protrusion by sliding.

The plurality of battery modules may include at least one sliding rail formed on at least one side surface thereof along the longitudinal direction of the plurality of battery modules, and the at least one sliding rail may be configured to be coupled to an adjacent battery module by sliding.

The sliding rail may be provided in plurality, and each of the plurality of sliding rails may include at least one sliding protrusion formed along the longitudinal direction of each battery module, and at least one sliding groove formed along the longitudinal direction of each battery module and spaced apart from the at least one sliding protrusion by a predetermined distance on at least one side surface of the battery module.

When the plurality of battery modules are coupled to each other, the at least one sliding protrusion may be coupled to the at least one sliding groove of the adjacent battery module, and when the plurality of battery modules are coupled to each other, the at least one sliding groove may be coupled to the at least one sliding protrusion of the adjacent battery module.

The battery pack may further comprise at least one module support beam disposed on the battery tray while being inserted along a height direction between two adjacent battery modules among the plurality of battery modules or inserted into at least one battery module.

In another aspect of the present disclosure, a vehicle may include at least one battery pack according to the above embodiments.

Advantageous Effects

According to various embodiments as above, it is possible to provide a battery pack, which may improve the space utilization of battery modules, and a vehicle including the battery pack.

In addition, it is possible to provide a battery pack, which may distribute the load when the battery module is coupled to a battery tray, and a vehicle including the battery pack.

Moreover, according to various embodiments as above, it is possible to provide a battery pack, which may improve the structural stability, and a vehicle including the battery pack.

Further, according to various embodiments as above, it is possible to provide a battery pack, which may improve the efficiency of the assembly process, and a vehicle including the battery pack.

DESCRIPTION OF DRAWINGS

The accompanying drawings illustrate a preferred embodiment of the present disclosure and together with the following disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
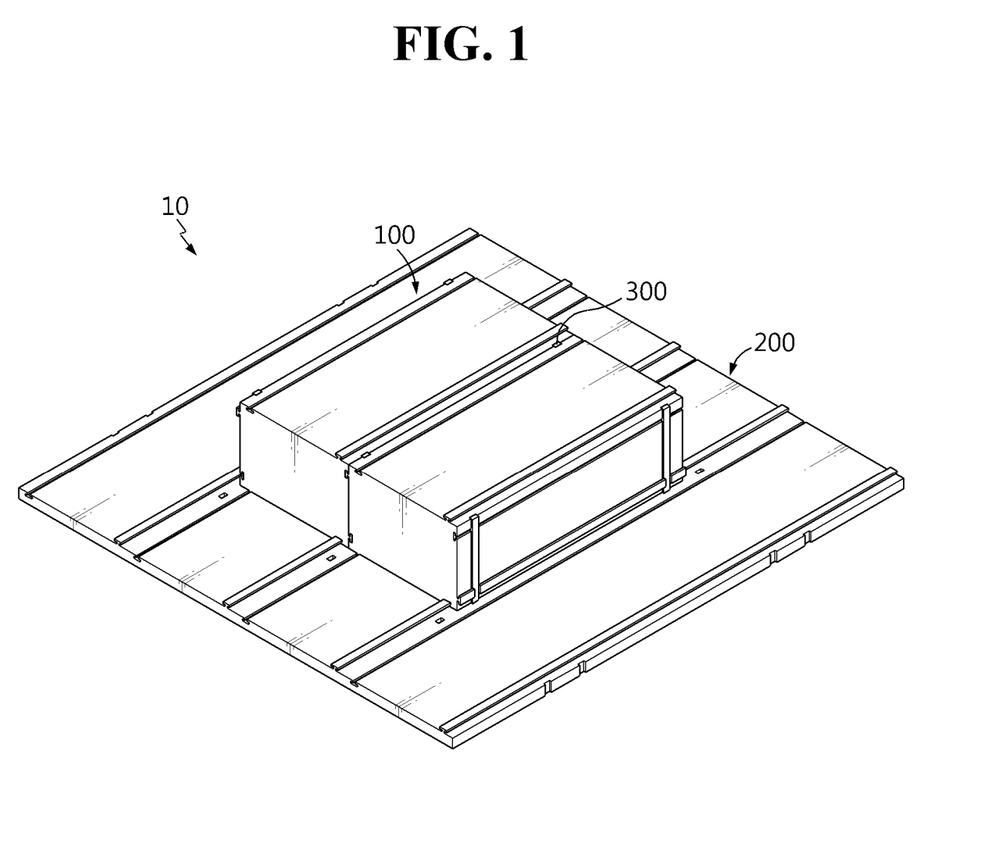
FIG. 1 is a perspective view illustrating a battery pack according to an embodiment of the present disclosure.
Figure 2:
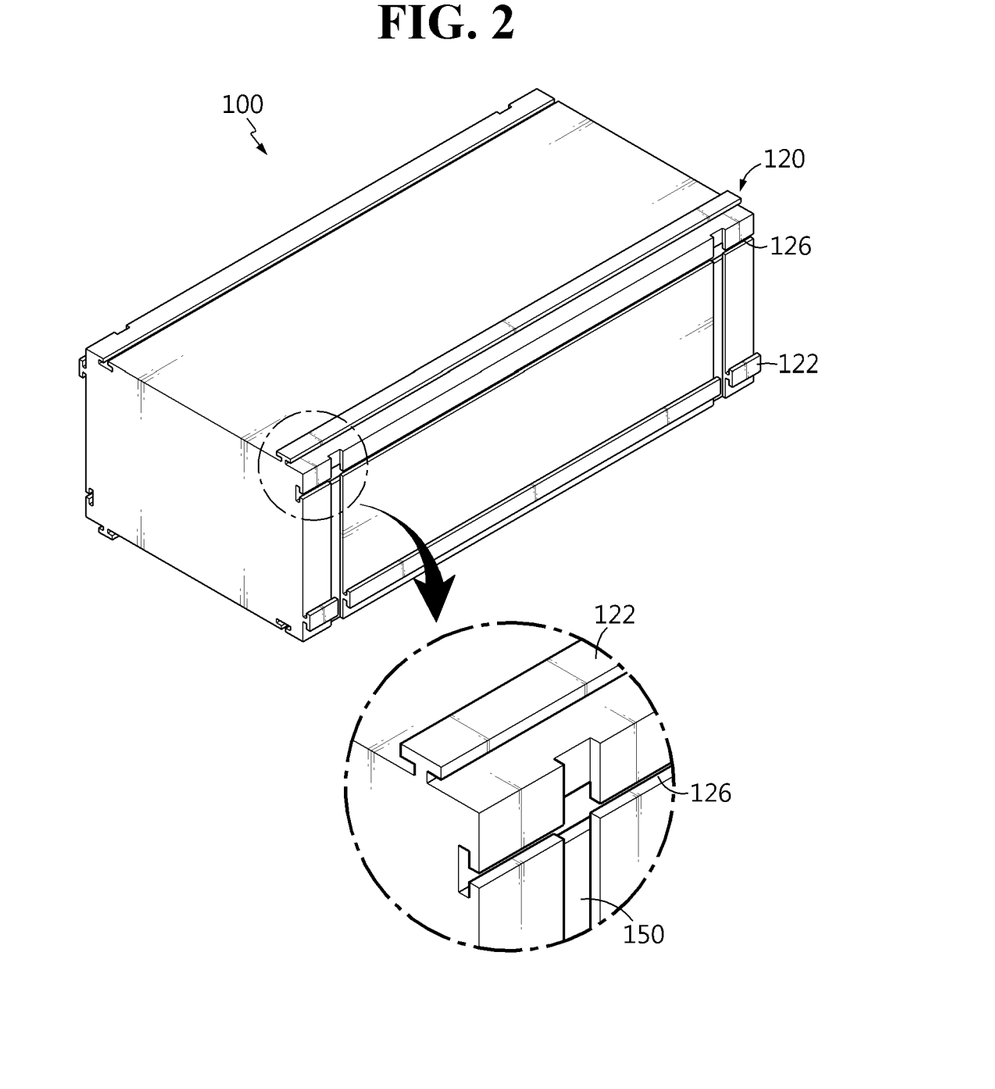
FIG. 2 is a perspective view illustrating a battery module of the battery pack of FIG. 1.
Figure 3:
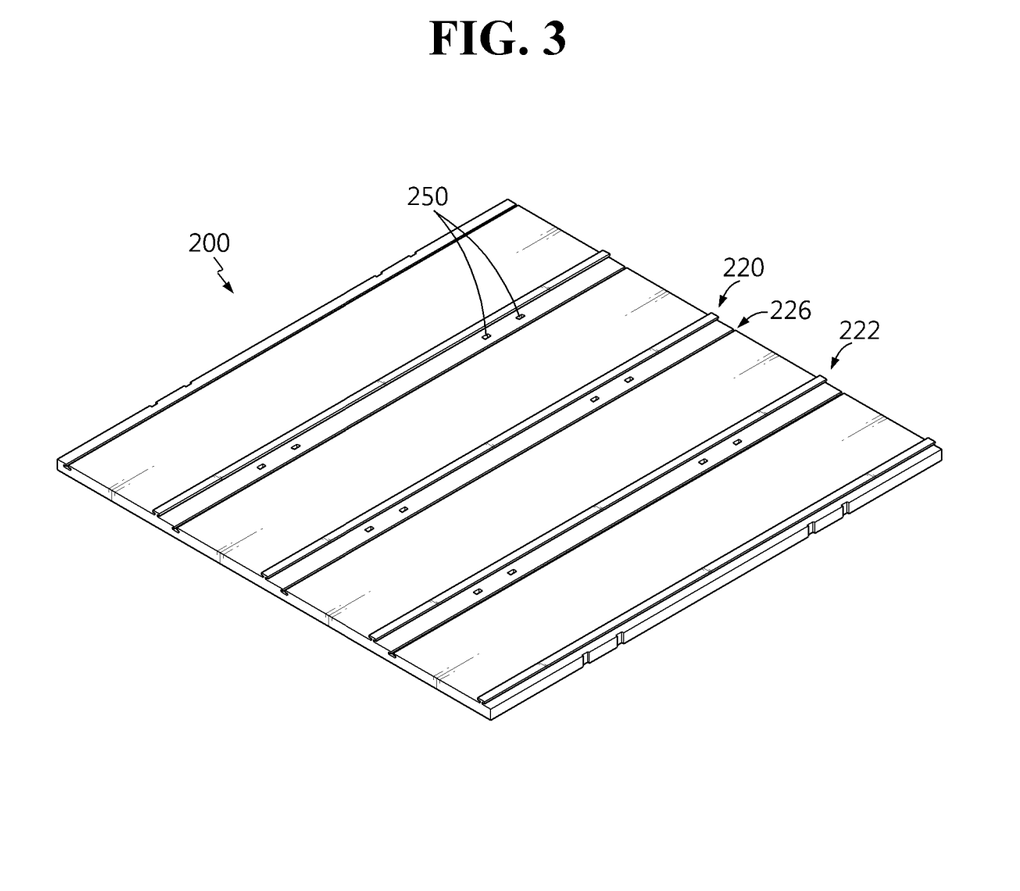
FIG. 3 is a perspective view illustrating a battery tray of the battery pack of FIG. 1.

FIG. 1 is a perspective view illustrating a battery pack according to an embodiment of the present disclosure, FIG. 2 is a perspective view illustrating a battery module of the battery pack of FIG. 1, and FIG. 3 is a perspective view illustrating a battery tray of the battery pack of FIG. 1.

Referring to FIGS. 1 to 3, a battery pack 10 may include a secondary battery as an energy source. The battery pack 10 may be provided for a power storage system or a vehicle, and may be mounted on an electric vehicle or a hybrid electric vehicle.

The battery pack 10 may include a battery module 100, a battery tray 200, and a module support beam 300.

The battery module 100 may include at least one battery cell or a plurality of battery cells. Accordingly, at least one battery cell or the plurality of battery cells may be accommodated in the battery module 100. Hereinafter, this embodiment will be described based on a case where a plurality of battery cells are provided. The plurality of battery cells may be secondary batteries, particularly lithium ion batteries.

At least one battery module 100 or a plurality of battery modules 100 may be provided. This embodiment will be described based on a case where a plurality of the battery modules 100 are provided.

When the battery pack 10 is configured, the plurality of battery modules 100 may be coupled to each other by sliding. In addition, the plurality of battery modules 100 may make surface contact with each other on at least one side surface thereof and may be mounted to a battery tray 200, which will be explained later, by slide-coupling.

Each of the plurality of battery modules 100 may include a sliding rail 120 and a beam insert groove 150.

The sliding rail 120 is formed along the longitudinal direction of the plurality of battery modules 100 and may be coupled to a sliding rail 120 of an adjacent battery module 100 by sliding. At least one sliding rail 120 or a plurality of sliding rails 120 may be provided. Hereinafter, this embodiment will be described based on a case where a plurality of sliding rails 120 are provided.

As shown in FIG. 2, the plurality of sliding rails 120 may be provided at an upper side, a lower side, a left side, and a right side along the longitudinal direction of the battery module 100, respectively. Accordingly, the plurality of battery modules 100 may be coupled to adjacent battery modules 100 at the upper, lower, left, and right sides thereof by sliding and may make surface contact with the adjacent battery modules 100 at the four surfaces.

Each of the plurality of sliding rails 120 may include a sliding protrusion 122 and a sliding groove 126.

The sliding protrusion 122 may be formed along the longitudinal direction of each battery module 100. In this embodiment, the sliding protrusion 122 may be formed at the upper, lower, left, and right sides of each battery module 100.

When the plurality of battery modules 100 are coupled to each other, each sliding protrusion 122 may be coupled to a sliding groove 126, which will be explained later, of an adjacent battery module 100 by sliding.

At least one of the plurality of sliding protrusions 122 may be coupled to the battery tray 200, which will be explained later, by sliding. More specifically, at least one of the plurality of sliding protrusions 122 may be coupled to a sliding guide groove 226, which will be explained later, by sliding.

The sliding groove 126 may be formed along the longitudinal direction of each battery module 100, similar to the sliding protrusion 122, and may be spaced apart from the sliding protrusion 122 by a predetermined distance on at least one side surface of the battery module 100. The sliding groove 126 may be formed also at the upper, lower, left, and right sides of each battery module 100.

When the plurality of battery modules 100 are coupled to each other, each sliding groove 126 may be coupled to the sliding protrusion 122 of an adjacent battery module 100 by sliding.

For the coupling by sliding, the sliding groove 126 and the sliding protrusion 122 formed at the upper side of each battery module 100 may be disposed opposite to the sliding groove 126 and the sliding protrusion 122 formed at the lower side of the battery module 100 in the vertical direction of the battery module 100. In addition, the sliding groove 126 and the sliding protrusion 122 formed at the left side of each battery module 100 may be disposed opposite to the sliding groove 126 and the sliding protrusion 122 formed at the right side of each battery module 100 in the lateral direction of the battery module 100. For example, the sliding groove 126 may be formed at a left side of the upper surface of the battery module 100, and the sliding protrusion 122 that corresponds to the sliding groove 126 may be formed at a left side of the lower surface of the battery module 100. In addition, the sliding groove 126 may be formed at an upper portion of the right surface of the battery module 100, and the sliding protrusion 122 that corresponds to the sliding groove 126 may be formed at an upper portion of the left surface of the battery module 100. As a result, the sliding protrusions 122 and the sliding grooves 126 may be alternately arranged on the outer surfaces of the battery module 100.

At least one of the plurality of sliding grooves 126 may be coupled to the battery tray 200, which will be explained later, by sliding. Specifically, at least one of the plurality of sliding grooves 126 may be coupled to a sliding guide protrusion 222, which will be explained later, by sliding.

The beam insert groove 150 is provided to allow a module support beam 300, which will be explained later, to be inserted therein, and may be formed along the vertical direction of the battery module 100. The beam insert groove 150 may be provided in plurality.

The plurality of beam insert grooves 150 may be provided at both side surfaces of the battery module 100. The plurality of beam insert grooves 150 may form a predetermined space together with the beam insert grooves 150 of an adjacent battery module 100 when the battery modules 100 are coupled to each other. The predetermined space may have a size into which the module support beam 300, which will be explained later, may be inserted.

The battery tray 200 may be mounted to the vehicle or the like. The plurality of battery modules 100 may be disposed on and mounted to the battery tray 200. In particular, the plurality of battery modules 100 may be mounted to the battery tray 200 by slide-coupling.

The battery tray 200 may include a sliding guide rail 220 and a beam placing groove 250.

The sliding guide rail 220 is for mounting at least one battery module 100 or a plurality of battery modules 100 by slide-coupling and may be formed along the longitudinal direction of the plurality of battery modules 100 on the battery tray 200.

At least one sliding guide rail 220 or a plurality of sliding guide rails 220 may be provided. In this embodiment, a plurality of battery modules 100 are provided, and thus the sliding guide rail 220 is also provided in plurality.

Each of the plurality of sliding guide rails 220 may include a sliding guide protrusion 222 and a sliding guide groove 226.

The sliding guide protrusion 222 is formed with a predetermined height and may be formed along the longitudinal direction of the battery tray 200. The sliding groove 126 of the battery module 100 may be coupled to the sliding guide protrusion 222 by sliding. Due to the coupling by sliding, the plurality of battery modules 100 may be in surface contact with the upper surface of the battery tray 200 when coupled to the battery tray 200 by sliding.

The sliding guide groove 226 has a predetermined depth and may be formed along the longitudinal direction of the battery tray 200, similar to the sliding guide protrusion 222. The sliding guide groove 226 may be spaced apart from the sliding guide protrusion 222 by a predetermined distance.

The sliding protrusion 122 of the battery module 100 may be coupled to the sliding guide groove 226 by sliding. Due to the coupling by sliding, the plurality of battery modules 100 may be in surface contact with the upper surface of the battery tray 200 when coupled to the battery tray 200 by sliding.

The beam placing groove 250 is formed at the upper surface of the battery tray 200, and a module support beam 300, which will be explained later, may be inserted in and fixed to the beam placing groove 250. The beam placing groove 250 may be provided in plurality, and when the battery modules 100 are mounted to the battery tray 200, the plurality of beam placing grooves 250 may be disposed at the bottom portion of the beam insert grooves 150 of the battery modules 100.

The module support beam 300 is formed with a predetermined length, and at least one module support beam 300 or a plurality of module support beams 300 may be provided. Hereinafter, this embodiment will be described based on a case where a plurality of the module support beams 300 are provided.

The plurality of module support beams 300 may be disposed on the battery tray 200 while being inserted along the height direction between two battery modules 100 that face each other among the plurality of battery modules 100 or inserted into at least one battery module 100.

After the plurality of battery modules 100 are coupled to the battery tray 200 by sliding, each module support beam 300 may be disposed on and fixed to the beam placing groove 250 of the battery tray 200 while being inserted into the beam insert groove 150 of the battery module 100.

Hereinafter, the assembling process of the battery pack 10 according to the embodiment will be described in more detail.

FIGS. 4 to 10 are perspective views illustrating an assembling process of the battery pack of FIG. 1.

Figure 4:
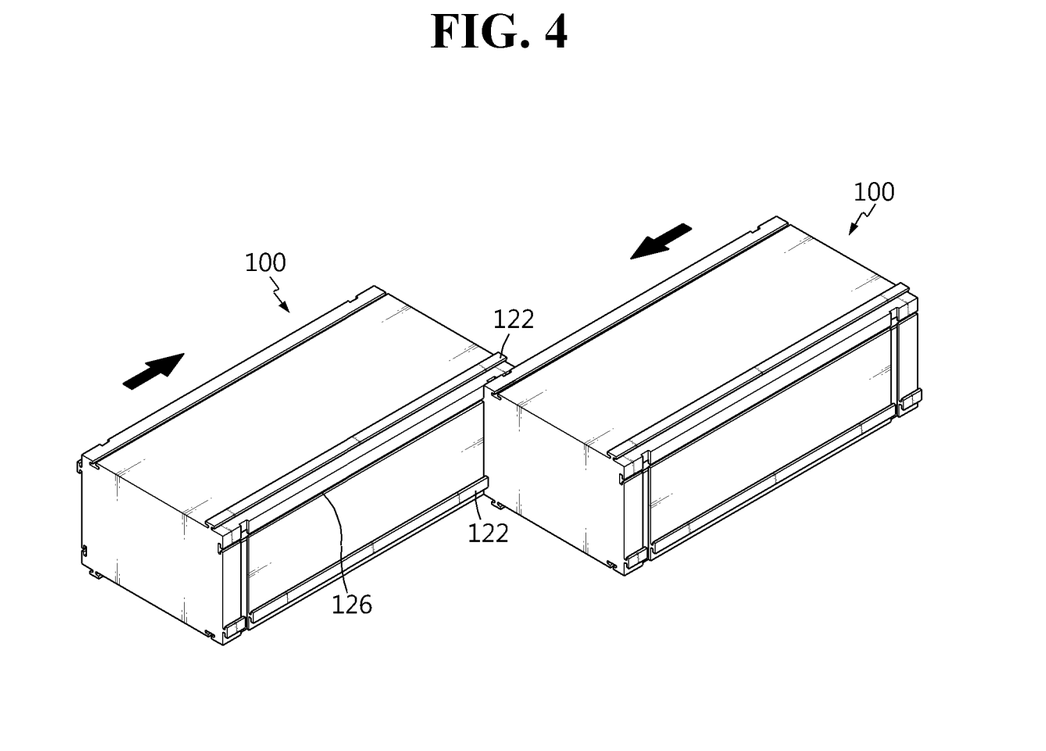
FIGS. 4 to 10 are perspective view illustrating an assembling process of the battery pack of FIG. 1.
Figure 5:
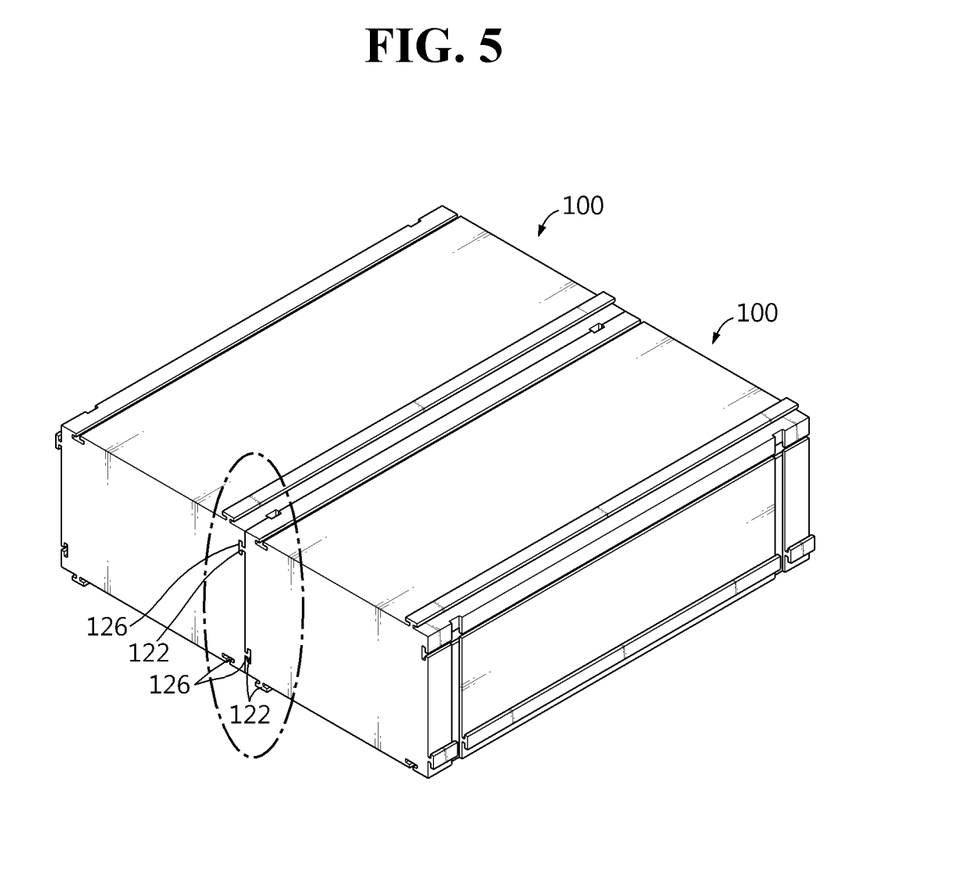
Figure 6:
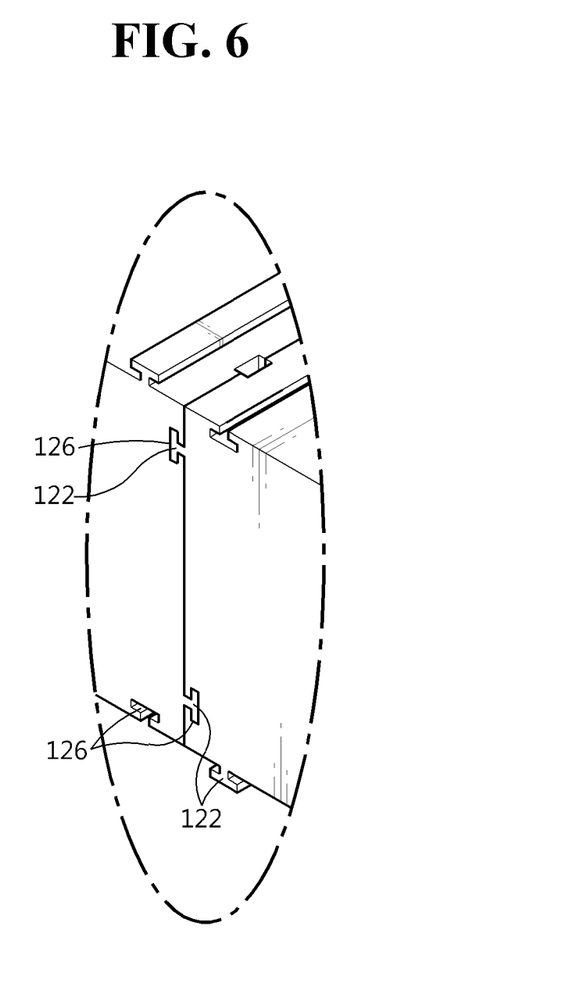

Referring to FIGS. 4 to 6, first, the plurality of battery modules 100 may be coupled to each other by sliding to make a surface contact with each other on at least one side surface thereof. Specifically, the plurality of battery modules 100 may be coupled to each other by sliding toward each other in the longitudinal direction of the plurality of battery modules 100. In particular, the sliding protrusion 122 of the sliding rail 120 of one battery module 100 may be coupled to the sliding groove 126 of the sliding rail 120 of another battery module 100 by sliding, and the sliding groove 126 of the sliding rail 120 of the one battery module 100 may be coupled to the sliding protrusion 122 of the sliding rail 120 of the another battery module 100 by sliding.

Meanwhile, although only slide-coupling between two battery modules 100 is depicted in the figures, the present disclosure is not limited thereto, and more battery modules may be additionally coupled thereto by sliding to make surface contact therewith on at least one side surface thereof. For example, additional battery modules 100 may be coupled by sliding on at least one of the top, bottom, left, and right sides of the battery modules 100 of FIG. 5.

Figure 7:
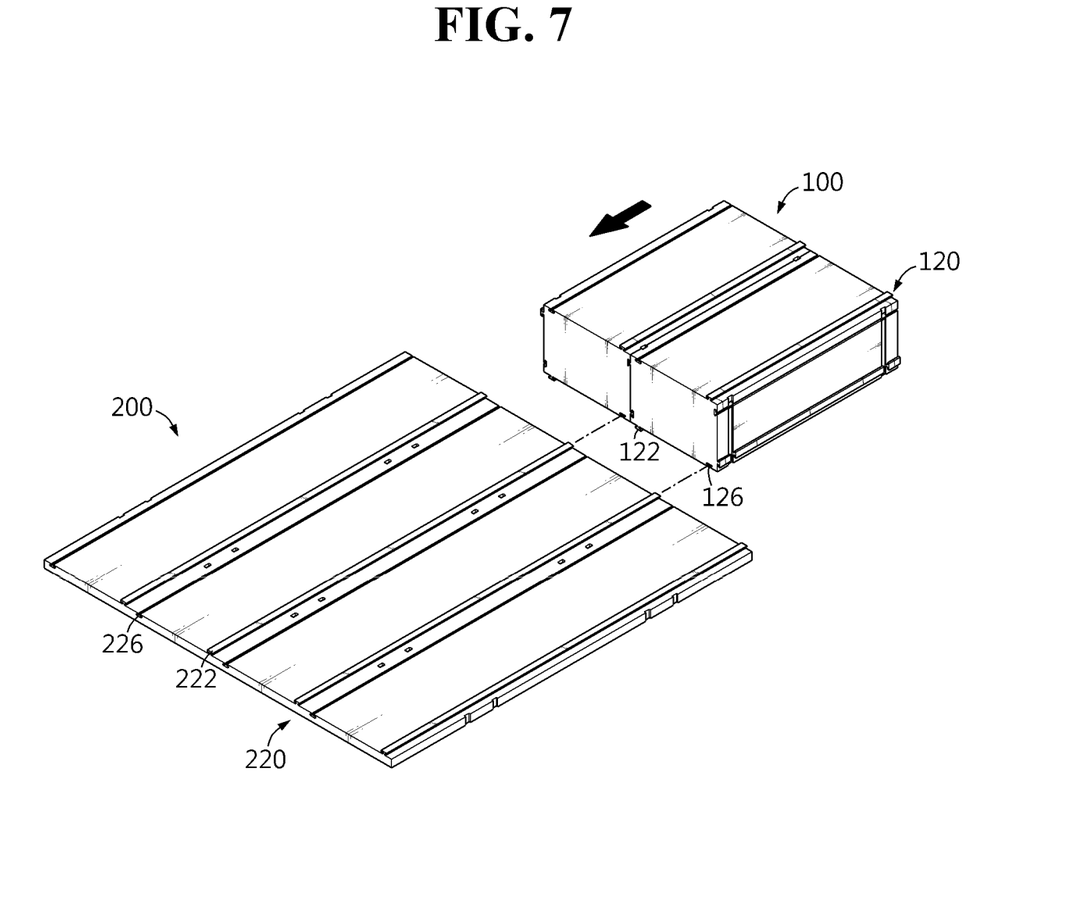
Figure 8:
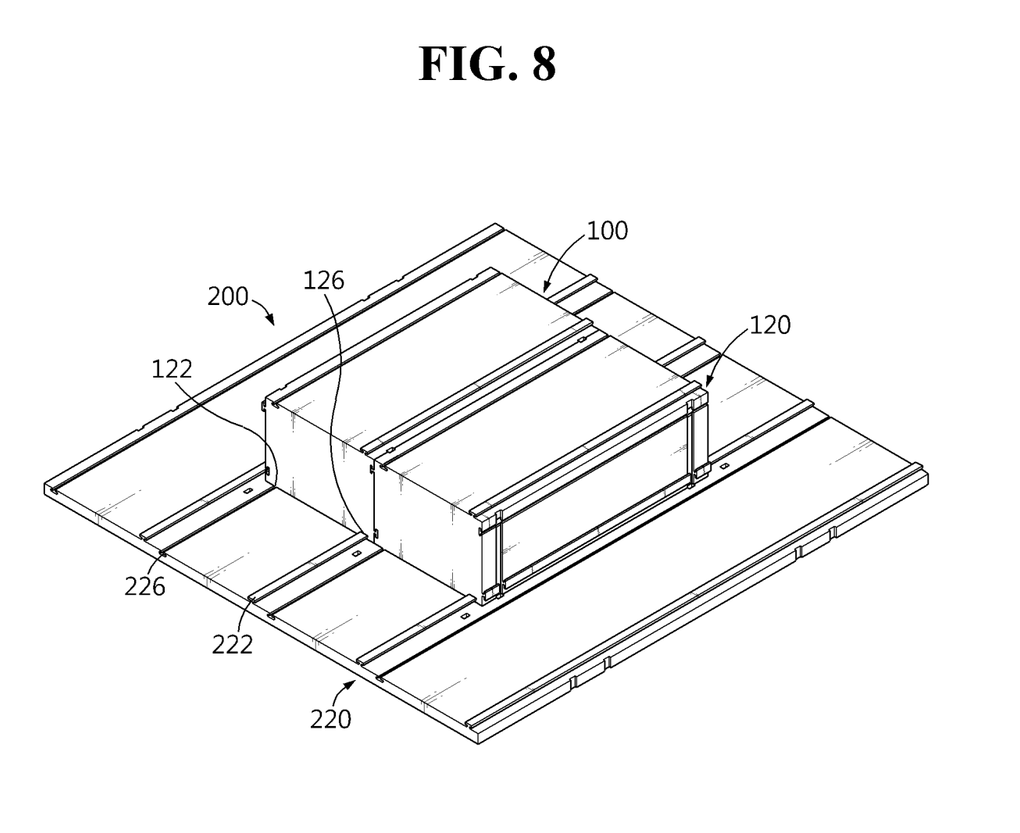

Referring to FIGS. 7 and 8, with the plurality of battery modules 100 coupled with each other by sliding, the plurality of battery modules 100 may be coupled to the battery tray 200 by sliding to make a surface contact with the upper surface of the battery tray 200.

Specifically, the plurality of battery modules 100 may be disposed on the upper surface of the battery tray 200 while sliding along the longitudinal direction of the battery tray 200. In particular, the sliding protrusion 122 of the sliding rail 120 provided at the bottom portion of the battery modules 100 may be coupled to the sliding guide groove 226 of the sliding guide rail 220 of the battery tray 200 by sliding, and the sliding groove 126 of the sliding rail 120 provided at the bottom portion of the battery modules 100 may be coupled to the sliding guide protrusion 222 of the sliding guide rail 220 of the battery tray 200 by sliding.

Meanwhile, although it is depicted in the figures that two battery modules 100 are coupled onto the battery tray 200 by sliding, the present disclosure is not limited thereto, and additional battery modules may be coupled onto the battery tray 200 by sliding. For example, battery modules 100 may also be coupled by sliding and disposed at an available space on the upper surface of the battery tray 200 of FIG. 8.

According to this coupling structure of embodiment, the battery modules 100 are in surface contact with each other, and also the battery modules 100 and the battery tray 200 are in surface contact with each other. Thus, an empty space, namely a dead space, caused by the separation between the battery modules 100 or between the battery modules 100 and the battery tray 200, may be prevented from forming.

Figure 9:
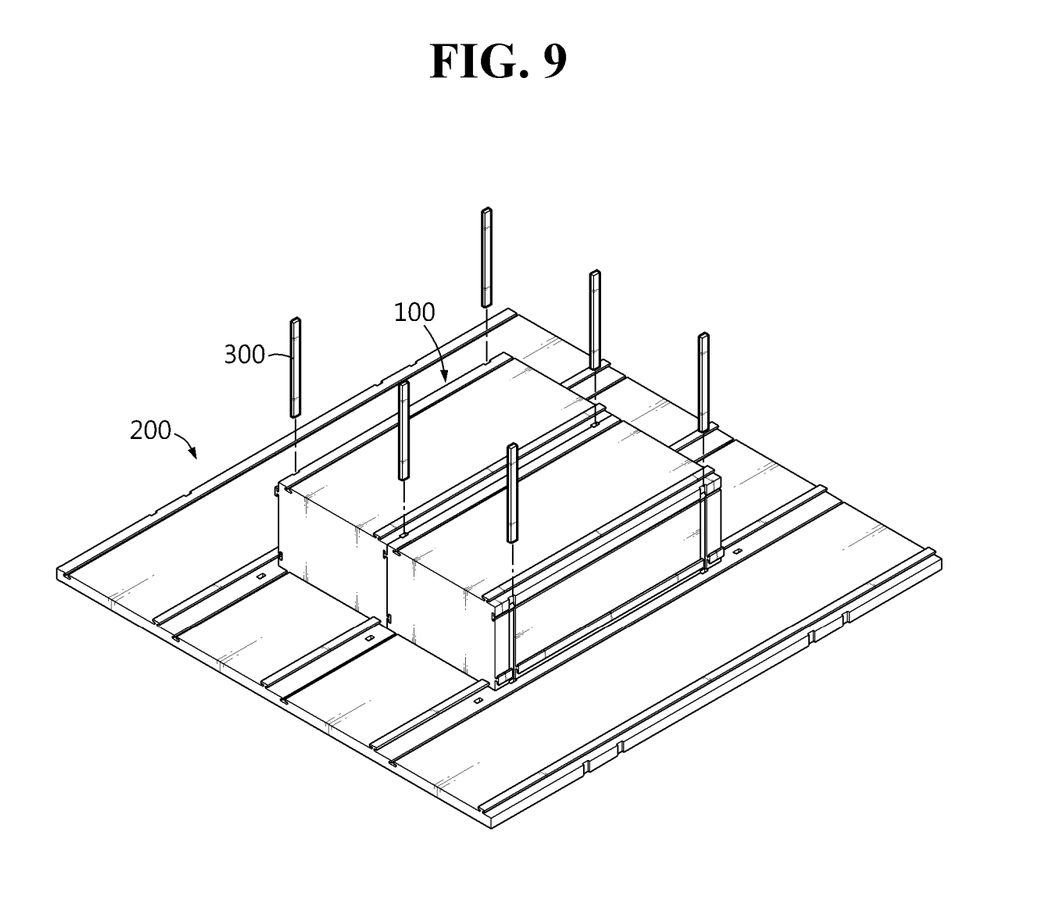
Figure 10:
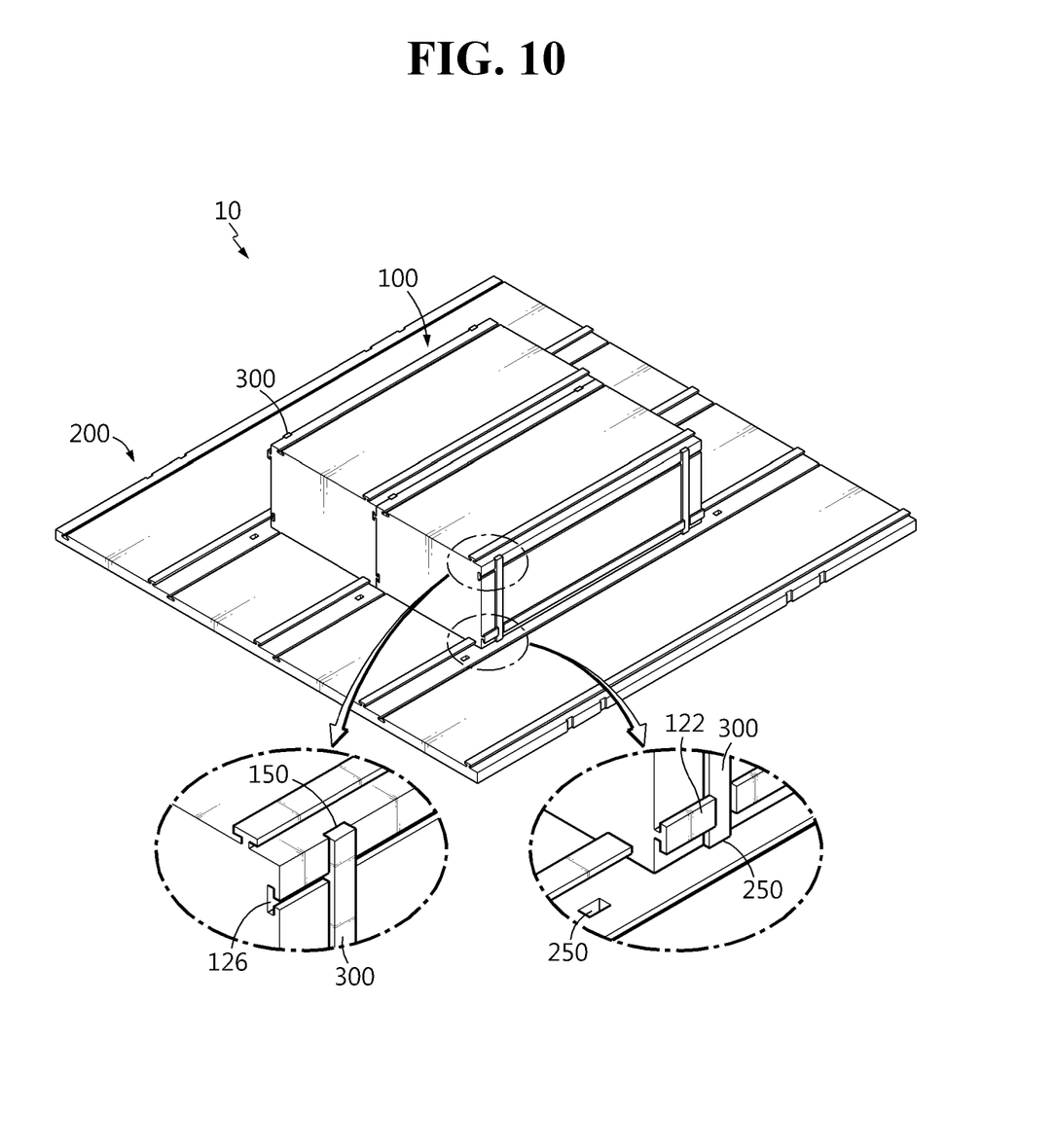

Referring to FIGS. 9 and 10, with the battery modules 100 coupled onto the battery tray 200 by sliding, the plurality of module support beams 300 may be inserted into and mounted to the battery modules 100.

The plurality of module support beams 300 may prevent the battery modules 100 from moving on the battery tray 200 and may also stably support the battery modules 100 on the battery tray 200.

As described above, in this embodiment, the battery modules 100 are coupled to each other by sliding to make surface contact with each other, and the battery modules 100 and the battery tray 200 are coupled to each other by sliding to make surface contact with each other. Thus, when the battery pack 10 is configured, an empty space may be prevented from forming between the battery modules 100 and/or between the battery modules 100 and the battery tray 200.

Accordingly, in this embodiment, since a dead space caused by an empty space between the battery modules or between the battery modules and the battery tray is prevented when the battery pack 10 is configured, the packing density of the battery modules 100 may be significantly increased, thereby maximizing the space utilization.

In addition, in this embodiment, when the battery pack 10 is configured, the battery modules 100 are coupled to the battery tray 200 by means of the sliding structure and the module support beam 300. Thus, it is possible to prevent the load concentration around the bolting coupling portion, which has been caused in a conventional structure where the battery modules and the battery tray are coupled by bolting. In other words, in this embodiment, the load may be distributed when the battery modules 100 and the battery tray 200 are coupled.

Moreover, in this embodiment, when the battery pack 10 is configured, after the battery modules 100 and the battery tray 200 are coupled by sliding, the battery modules 100 may be prevented from moving due to the module support beam 300, thereby further improving the structural stability.

Further, in this embodiment, when the battery pack 10 is configured, a bolting process such as screwing may be omitted. Thus, the efficiency of the assembly process may be remarkably increased, and also the battery modules 100 may be managed more easily in the future in view of maintenance such as substitution of the battery modules 100.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
a plurality of battery modules, each module having at least one battery cell, and each module having a length in a longitudinal direction, a width in a transverse direction, and a height in a height direction that are mutually intersecting;
a battery tray to which the plurality of battery modules are mounted, wherein the plurality of battery modules are coupled to each other by sliding and make surface contact with each other on at least one side surface thereof along the longitudinal direction; and
a beam insert groove formed on the at least one side surface thereof, and extending in the height direction of the plurality of battery modules.

2. The battery pack according to claim 1, wherein the plurality of battery modules are coupled to the battery tray by sliding.

3. The battery pack according to claim 2, wherein the battery tray includes a plurality of sliding guide rails formed along the longitudinal direction of the plurality of battery modules to allow the plurality of battery modules to be mounted thereto by sliding.

4. The battery pack according to claim 3, wherein the plurality of sliding guide rails include:
at least one sliding guide groove formed along the longitudinal direction of the battery tray and having a predetermined depth; and
at least one a sliding guide protrusion spaced apart from the at least one sliding guide groove by a predetermined distance and protruding with a predetermined height.

5. The battery pack according to claim 4, wherein each of the plurality of battery modules includes:
at least one sliding protrusion configured to be coupled to the at least one sliding guide groove by sliding; and
at least one sliding groove configured to be coupled to the at least one sliding guide protrusion by sliding.

6. The battery pack according to claim 1, wherein the plurality of battery modules include at least one sliding rail formed on at least one side surface thereof along the longitudinal direction of the plurality of battery modules, the at least one sliding rail configured to be coupled to an adjacent battery module by sliding.

7. The battery pack according to claim 6, wherein a plurality of sliding rails are provided, and
wherein each of the plurality of sliding rails includes:
at least one sliding protrusion formed along the longitudinal direction of each battery module; and
at least one sliding groove formed along the longitudinal direction of each battery module and spaced apart from the at least one sliding protrusion by a predetermined distance on at least one side surface of the battery module.

8. The battery pack according to claim 7, wherein when the plurality of battery modules are coupled to each other, the at least one sliding protrusion is coupled to the at least one sliding groove of the adjacent battery module, and wherein when the plurality of battery modules are coupled to each other, the at least one sliding groove is coupled to the at least one sliding protrusion of the adjacent battery module.

9. The battery pack according to claim 1, further comprising:

at least one module support beam disposed on the battery tray while being inserted along the height direction between two adjacent battery modules among the plurality of battery modules or inserted into at least one battery module.

10. A vehicle comprising at least one battery pack according to claim 1.

11. The battery pack according to claim 1, wherein the beam insert groove intersects the at least one sliding protrusion and the at least one sliding groove that extend in the transverse direction of the plurality of battery modules.

12. A battery pack, comprising:

a plurality of battery modules, each having at least one battery cell;

a battery tray to which the plurality of battery modules are mounted; and at least one module support beam disposed on the battery tray while being inserted along a height direction between two adjacent battery modules among the plurality of battery modules or inserted into at least one battery module, wherein the plurality of battery modules are coupled to each other by sliding and make surface contact with each other on at least one side surface thereof.

13. A battery pack, comprising:

a plurality of battery modules, each module having at, least one battery cell, and each module having a length in a longitudinal direction, a width in a transverse direction, and a height in a height direction that are mutually intersecting; and a battery tray to which the plurality of battery modules are mounted, wherein the plurality of battery modules are coupled to each other by sliding and make surface contact with each other on at least one side surface thereof in the longitudinal direction, wherein each of the plurality of battery modules includes:

a sliding groove and a sliding protrusion that are separated by a distance in the transverse direction and formed on the same surface of a least one side surface of each battery module, and wherein the sliding groove and the sliding protrusion extend in the longitudinal direction of each battery module, the battery pack further comprising a beam insert groove formed on the at least one side surface thereof, and extending in the transverse direction of each battery module.

* * * * *